J. PEARSON.

CAR ROOF.

APPLICATION FILED APR. 19, 1910.

Reissued Oct. 1, 1912.

13,471.

2 SHEETS—SHEET 1.

Witnesses:
G. W. Donaldson Jr.
Edith Wilcox

Inventor:
By John Pearson
Coburn & McPherson Attys.

J. PEARSON.
CAR ROOF.
APPLICATION FILED APR. 19, 1910.
Reissued Oct. 1, 1912.
13,471
2 SHEETS—SHEET 2.
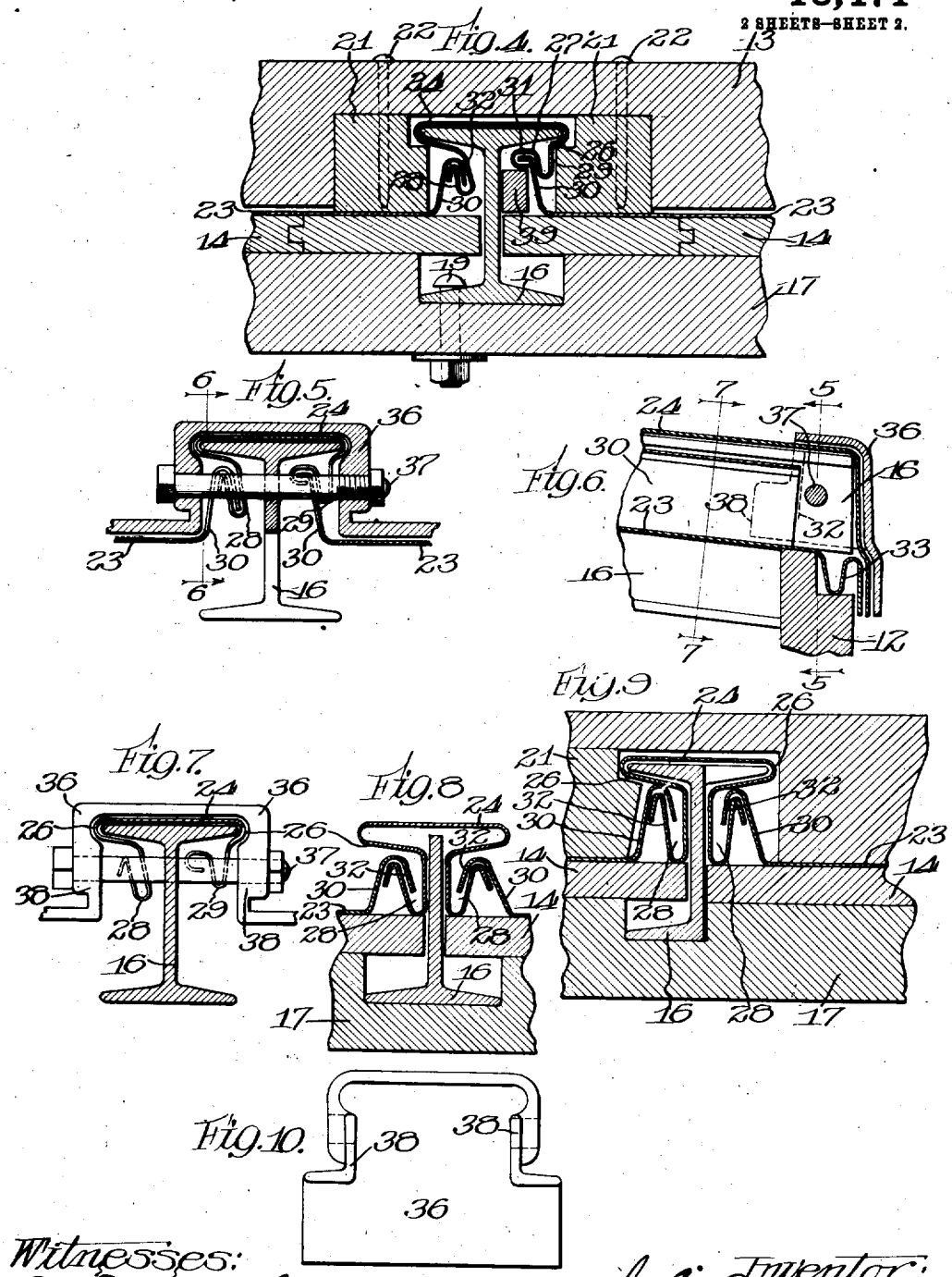
Witnesses:
G. V. Demarus Jr.
Edith Wilcox
Inventor:
John Pearson
By: Coburn & McRoberts
Atty's:

UNITED STATES PATENT OFFICE.

JOHN PEARSON, OF CHICAGO, ILLINOIS.

CAR-ROOF.

13,471. Specification of Reissued Letters Patent. Reissued Oct. 1, 1912.

Original No. 940,355, dated November 16, 1909, Serial No. 330,050. Application for reissue filed April 19, 1910. Serial No. 556,456.

*To all whom it may concern:*

Be it known that I, JOHN PEARSON, a citizen of the United States, residing at Chicago, in the county of Cook and State of Illinois, have invented certain new and useful Improvements in Car-Roofs, of which the following is a specification, reference being had therein to the accompanying drawings.

My invention relates to new and useful improvements in car-roofs, the principal object of the invention being to provide an improved metal roof composed of plates or panels having sufficient play to yield to any strain to the car-body and to expansion and contraction due to changes in temperature.

Another object is to provide an improved frame-work for car roofs whereby the car-body is more effectively braced.

Another object is to provide an improved construction for securing the running-board in position.

Other objects of the invention will be apparent from the disclosure and claims.

The invention consists in the constructions and arrangements of parts as hereinafter described and pointed out in the claims, and as illustrated in the accompanying drawings, in which—

Figure 1:
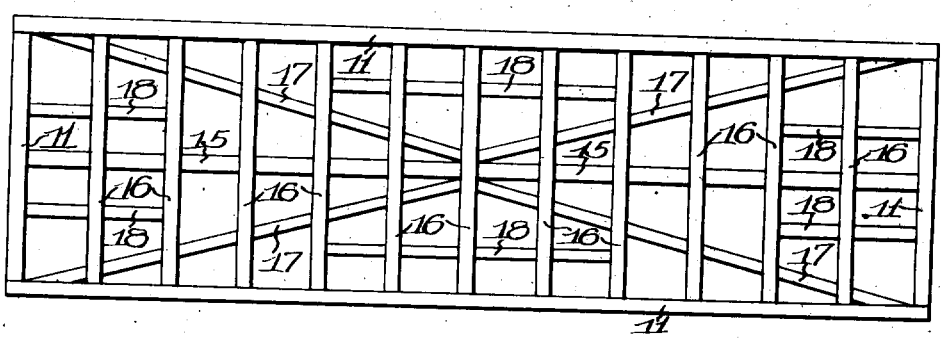
Figure 2:
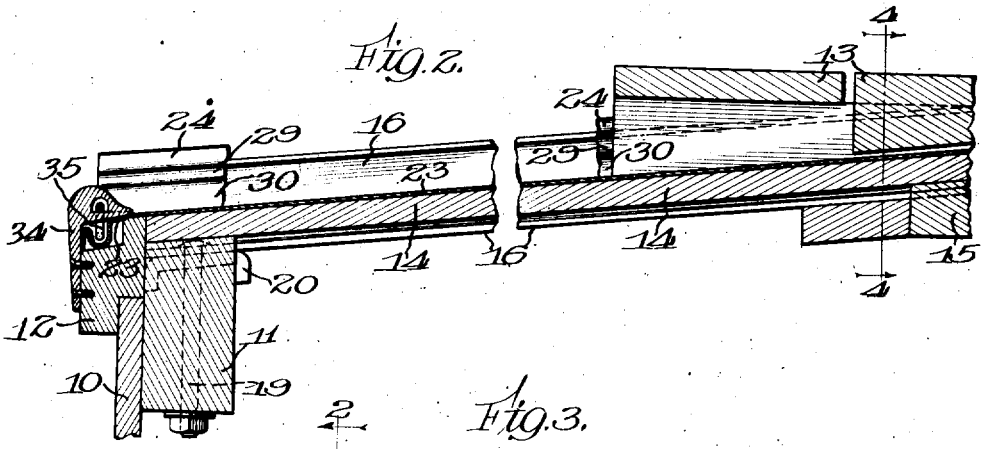
Figure 3:
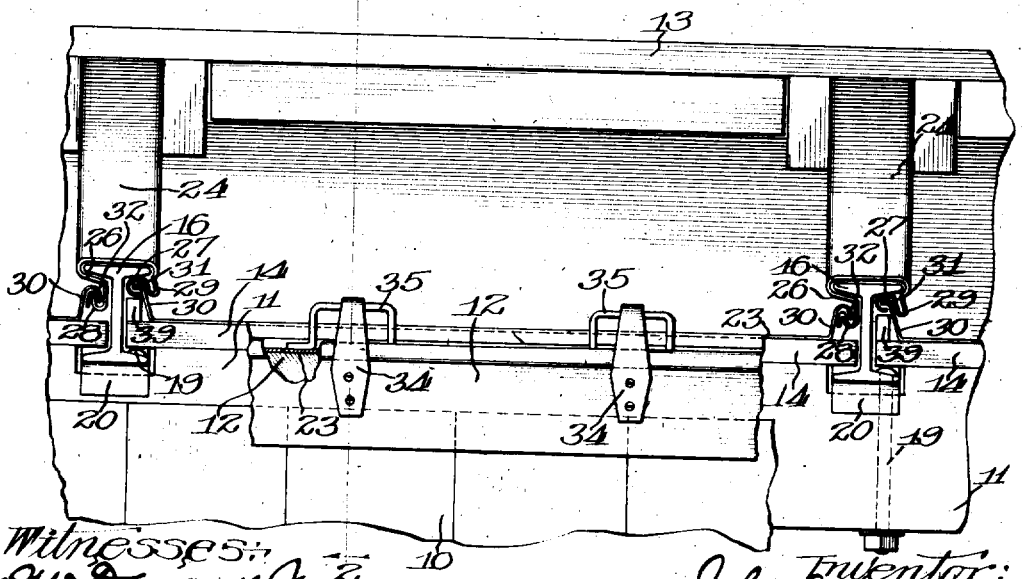

Figure 1 is a top plan view showing the improved frame-work of the car roof; Fig. 2 is a cross-sectional view of one side of the car roof taken on the line 2—2 of Fig. 3, parts being broken away; Fig. 3 is a view partly in side elevation and partly in section showing details of the preferred construction; Fig. 4 is a cross-sectional view on the line 4—4 of Fig. 2 and showing various features hereinafter fully described; Fig. 5 is a sectional view on the line 5—5 of Fig. 6 showing the construction and relation of parts at the ends of the cross-beams; Fig. 6 is a detail sectional view on the line 6—6 of Fig. 5; Fig. 7 is a detail view on line 7—7 of Fig. 6; Fig. 8 is a detail view partly in section on the same line as Fig. 4 and showing a modification; Fig. 9 is a similar view on the same line as Fig. 4 and showing another modification, and Fig. 10 is an end view of the hood.

In the drawings, the reference numeral 10 indicates the siding forming the end and side walls of the car-body which is provided with interior side and end-plates 11 and facia or crown-mold 12 at the eaves. The roof is provided with running boards 13, and the roof-boards 14 extend from the ridge to the side-plates in the usual manner where they are flush with the crown-mold, all as shown in Fig. 2.

The frame-work of the roof consists of a ridge-pole 15, a series of carlines 16 suitably spaced apart and extending the width of the car, and diagonal braces 17 extending from the four corners of the car to the intersection of the ridge-pole and the central carline, as clearly shown in Fig. 1. Longitudinal braces or purlins 18 may be employed if desired to add structural strength to the car and to form supports for the roof-boards between the ridge-pole and the diagonal braces, being fastened to the under sides of the car-lines by bolts or other suitable means. The carlines 16 are located above the ridge-pole and diagonal braces as shown in Fig. 1, and at their crossing and meeting points are seated in gains in the braces and ridge-pole, as clearly shown in Fig. 4.

If desired, the carlines and braces may be further connected together at their crossing and meeting points by any suitable means, such as bolts 19 shown in Fig. 4. These connections are readily made as the carlines preferably consist of I-beams, as shown in Figs. 2 and 4, and the bolts may pass through their flanges, but it is of course to be understood that any other suitable form may be used for the carlines, such as angle irons, T-irons, or deck-beams, with any suitable connections if desired, without in any way departing from my invention.

By having the diagonal braces rigidly secured to the body-carlines the bracing action or effect thereof extends from each carline to adjacent ones, and the entire roof structure is braced to reduce straining or twisting action to a minimum. By having the body-carlines overlying the ridge-pole, braces, and purlins, the latter and the roof-materials are all supported and carried by the carlines.

The carlines 16 are suitably connected at their ends to the walls of the car-body, and as a convenient means of making this connection I provide suitable clamp-plates 20, each of which is seated in a gain or mortise in the side-plates 11. The clamp-plates 20 preferably have down-turned ends engaging the side-plates, as clearly shown in Fig. 2. The ends of each carline may be secured to its associated clamp-plates in any suitable manner, and as shown in Fig. 2, I employ bolts 19 which pass through the lower flange of the carline and its associated clamp-plate 20 and side-plate 11.

The carlines are located above the ridge-pole and diagonal braces upon which the roof-boards 14 rest, as clearly appears from the drawings, so that the webs of the carlines 16 pass through the boards and their crown-flanges extend above the upper face thereof. This extension may be conveniently utilized for the purpose of holding the running-boards in place. As shown in Fig. 4, a cleat 21 of suitable length extends parallel with one or more of the carlines 16, and is adapted to support the running-board.

When the carlines are in the form of I-beams, as shown in Fig. 4, the cleats extend at one edge under their exposed crown-flanges and when the running-boards are secured to the cleats by any suitable means, such as the nails 22, it is obvious that the co-operation of the cleats with the flanges of the carlines serves to hold the running-boards in place. It is of course apparent that the cleats need not be provided for each of the carlines, as they may be associated with one or more of them, and that they may be provided upon opposite sides of alternate or separated carlines.

When the carlines are in the form of angle irons, as shown in Fig. 9, the cleats 21 may be arranged in substantially the same manner, it of course being obvious that the upper flanges of some of the carlines may then be oppositely disposed in order to provide for the opposite disposition of the cleats so as to hold the running-boards against movement in either direction.

When the carlines are provided with upper flanges it is preferable to undercut the cleats, substantially as shown in Figs. 4 and 9, so that the shoulders formed thereon will coöperate with the edges of the flanges, while their upper faces will be flush with the upper faces of the crown-flanges, although it is obvious that the cleats may be in the form of plain strips and the running-boards may be grooved or channeled to fit over the upper flanges of the carlines.

The metallic portion of the roof consists of a series of plates or panels 23 of any suitable material, such as galvanized metal for example, which lie upon the roof-boards between the carlines and extend across the width of the car. The plates or panels are flexibly secured to caps which are associated with the carlines, each cap extending along the length of its associated carline across the width of the car and being preferably in two sections abutting at the center. The joint thus formed between the sections of the caps may be protected in any suitable manner, and it is obvious that the cleats 21 to which the running-board is secured will furnish a convenient means for this purpose, they being preferably located at both sides of each carline, and lapping past the abutting ends of the sections of the caps. The caps are provided with upper horizontal portions 24 of sufficient width to extend across the carlines and of greater length than the carlines so that their ends 25 may be turned down over the ends of the car lines, as shown in Fig. 6. The caps are provided at each side with a return bend 26 whereby the caps are secured to the carlines and their sides are brought under and protected by their horizontal portions 24.

The side edges of the caps are adapted to flexibly interlock with the side edges of the panels 23, and for this purpose I prefer to provide such joints that the panels or plates may be laid in place between the carlines and the associated caps may be interlocked therewith by telescoping their side edges into the plates from the end while sliding them in place on the associated carlines. This may be accomplished in a number of different ways, and for this purpose I provide one side of each cap with a horizontal pocket 27 and the opposite side with a vertical pocket 28 adapted respectively to receive horizontal and vertical flanges on the associated sides of the panels, as shown in Figs. 3 and 4. The vertical pocket 28 is formed by extending one side of the cap beyond the return bend downwardly and then upwardly; and the pocket 27 is formed by extending the other side of the cap inwardly and then outwardly, a vertical lip or curtain 29 being preferably formed to render the joint more effectually water proof. The sides of the plates or panels are upturned, as shown at 30, and the edge of one of the upturned sides is provided with a horizontal flange 31, while the edge of the opposite side is provided with a vertical depending flange 32. The panels are laid in place between the carlines, and their flanges are then inserted in the ends of the pockets of the caps and telescoped therewith as the sections of the latter are slid in place upon the carlines.

The form of joint between the caps and plates may be varied without departing from my invention. For example, the pockets on both sides of each cap may be formed in the same manner as the vertical pocket 28, and the side edges of adjacent panels may be provided with flanges 32 to interlock therewith, as shown in Figs. 8 and 9.

The joints allow the panels to move independently of each other and with sufficient elasticity in case of straining of the car-body, and any panel may be easily and readily removed and replaced in case repairs are necessary, while they also may be nested one within the other for convenience of shipping. The inter-connection of the plates, caps and carlines serves to securely hold the parts of the roof together, and to prevent the ingress of water, snow, sparks, etc., while at the same time the panels are free to move upon each other or have sufficient play to allow them to take up any strain or movement caused by the action of the car body without buckling or fracture at their joints which is the initial point of breakage in most metal roofs.

The ends of the panels or plates are downturned, as shown in Fig. 2, where they lie in a rabbet formed longitudinally in the upper edge of the crown-mold. The ends of the plates are downturned and provided with double return bends 33, with their edges overlying the outer face of the crown-mold. The rabbet in the crown-mold permits the plates to have sufficient play due to any movement of the car-body, and their downturned edges form tight connection or joints. The ends of the plates are preferably held close down in the rabbet of the crown-mold, and for this purpose I preferably provide means which does not interfere with any play or movement of the plates.

As shown in Figs. 2 and 3, I provide suitable brackets 34, secured to the crown-mold and projecting above and over the upper edge thereof. These brackets are disposed along the sides of the car at intervals between the carlines, and each bracket is provided with a passage or opening in its upper inwardly projecting portion adapted to receive an arched link 35, whose ends bear upon the panels or plates. The links have free rocking movement in their brackets to yield to any movement of the panels due to any strain to the car-body.

The outer ends of the end-panels are merely bent over the end-plates 11 and suitably secured.

The ends of the carlines are recessed or cut away in order to receive the upper portion of the crown-mold where it extends above the side-plates, as shown in Fig. 2. The ends of the carlines are provided with hoods 36, and I show a suitable construction for this purpose in Figs. 5, 6 and 7, although of course the details may be varied without departing from my invention. Each of the hoods is preferably of malleable metal, and in general outline is U-shape in both vertical and horizontal cross-section, its contour being shown in Figs. 5 and 6, whereby it is adapted to fit over the corresponding carline with its associated cap whose ends 25 are bent down over the ends of the carline. The open mouth of the hood is adapted to be slipped over the end of the carline and secured in position by any suitable means such as a bolt 37 passing through the side walls of the hood and the web of the carline, it being understood that the panels 23 are recessed or cut back along their upturned sides 30 sufficiently so that they are free from the bolts, as shown in Fig. 6. The outer portions of the hoods pass down below the level of the edges of the plates as shown in Fig. 6, and their inner ends 38 are in the form of wings which are bent inwardly toward each other as shown in Fig. 7 under the horizontal portion 24, and which overlap the ends of the upturned portions 30 of the panels. The ends 26 of the caps extend over the ends of the carlines and in conjunction with the hoods provide a passage to carry off any water that may pass beneath the hoods.

I have heretofore stated that the form of the carlines may be varied without departing from my invention, and in order to illustrate the organization when some forms other than I-beams are used, I have illustrated two modifications in Figs. 8 and 9. In Fig. 8 the carline is shown in the form of an inverted T-iron, and in Fig. 9 in the form of a channel bar.

A strip 39 may be employed if desired to prevent the horizontal pocket from sagging under the strain of the associated panel.

It is of course obvious that the fastening for the ends of the carlines may be varied; for example, the clamp-plates 20 may be riveted or otherwise secured to the flanges of the carlines and then suitably secured to the side-plate 11.

By providing a construction by which the plates or panels may be inserted in place from above I am enabled to utilize panels which extend the entire width of the car, thereby reducing the cost of assembling the parts and also obviating all of the objections and defects of fracture at the ridge-pole incident to a joint between sections of panels each extending only half of the width of the car, or to bending a panel at the ridge-pole when inserted from either side across the width of the car. At the same time the connections of the roof plates or panels with their caps and flexible end-links allow sufficient play or elasticity in all directions to avoid danger of buckling the panels or breaking of joints due to expansion or contraction by reason of changes in temperature or to any movements caused by the straining of the car-body. The provision of carlines lying above the ridge pole and braces enables me to utilize these carlines for the purpose of furnishing suitable supports for the caps, whereby the plates or panels are accurately and securely held in place, and also for the purpose of holding the running-board in place.

I claim:—

1. In a car roof, a ridge-pole, diagonal braces extending from the sides of the car to the ridge-pole, a series of carlines extending the width of the car above the pole and braces and seated in the braces and pole and supporting the same, and roof panels between the carlines.

2. In a car roof, a ridge-pole, diagonal braces extending from the sides of the car to the ridge-pole, a series of carlines extending the width of the car above the pole and braces and stepped into the braces and pole, and roof-panels between the carlines.

3. In a car-roof, a ridge-pole, diagonal braces extending from the sides of the car to the pole, a series of purlins, a series of carlines extending the width of the car above the pole, purlins, and braces, means to secure the carlines to the pole, purlins, and braces at their intersections therewith, and roof-panels between the carlines.

4. In a car-roof, a ridge-pole, diagonal braces extending from the sides of the car to the pole, a series of purlins, a series of metallic body-carlines extending the width of the car above the pole, braces, and purlins, means to secure the carlines to the pole, braces, and purlins at their intersections therewith, metallic panels supported by the braces and purlins intermediate the carlines and having upturned edges lying adjacent the carlines, and caps on the carlines covering the edges of adjacent panels, the caps having their outer ends turned down over the ends of the associated carlines.

5. In a car-roof, a ridge-pole, diagonal braces extending from the corners of the car to the center of the ridge-pole, and a series of carlines extending the width of the car above the pole and braces and stepped into the diagonal braces.

6. In a car-roof, a ridge-pole, diagonal braces extending from the corners of the car to the center of the pole, a series of purlins, a series of carlines extending the width of the car above the pole, purlins, and braces, and means to secure the carlines to the pole and to the braces at their intersections therewith.

7. In a car-roof, a series of carlines extending above the roof-boards, a running board, and cleats coöperating with opposite sides of the carlines and secured to the running board.

8. In a car-roof, a series of carlines extending above the roof-boards, a running board and opposite cleats secured to the board and coöperating with the carlines, to prevent displacement of the board.

9. In a car-roof, a series of flanged carlines extending above the roof-boards, a running board, and cleats secured to the running-board and extending under the flanges of the carlines.

10. In a car-roof, a series of carlines extending above the roof-boards, caps interlocking with the carlines and having outwardly opening pockets, and panels having flanges adapted to enter said pockets.

11. In a car-roof, a series of roof boards extending from the ridge to the side plates, a series of carlines extending through and above the roof-boards, caps on the carlines having horizontal portions and pockets beneath the horizontal portions, and panels having flanges adapted to enter said pockets.

12. In a car-roof, a series of carlines, panels intermediate the carlines, and caps adapted to interlock with the panels and carlines by sliding connections.

13. In a car-roof, a series of carlines, caps slidable upon said carlines and interlocking therewith, and panels slidably interlocking with said caps.

14. In a car-roof, a series of carlines extending above the roof-boards, sectional caps slidable upon the carlines and having pockets, and panels extending the width of the car and having flanges adapted to enter said pockets.

15. In a car-roof, a series of carlines, caps interlocking with the carlines, and a series of panels or plates extending the width of the car and slidably engaging the caps at their sides.

16. In a car-roof, a series of carlines, caps on the carlines, and a series of panels or plates extending the width of the car and slidably engaging the caps at their sides and hoods on the ends of the carlines, having wings overlapping the panels.

17. In a car-roof, a series of carlines, caps slidable on the carlines, panels slidably engaging the caps, and hoods on the ends of the carlines, having wings overlapping the panels.

18. In a car-roof, a series of carlines, caps on the carlines, a series of panels extending the width of the car and loosely engaging the caps, and a series of links flexibly engaging the ends of the panels.

19. In a car-roof, a series of carlines extending between the crown-molds, caps on the carlines, a series of panels engaging the caps and having their ends formed with return bends lying in rabbets of the mold, a series of brackets on the mold, and a series of links pivoted in the brackets and having their ends engaging the ends of the panels.

JOHN PEARSON.

Witnesses:
GEORGE R. HARBAUGH,
J. MCROBERTS.